Jan. 6, 1925.
R. TEDESCO
SECURING MEANS FOR LUNCH BOXES
Filed April 16, 1924
1,522,085
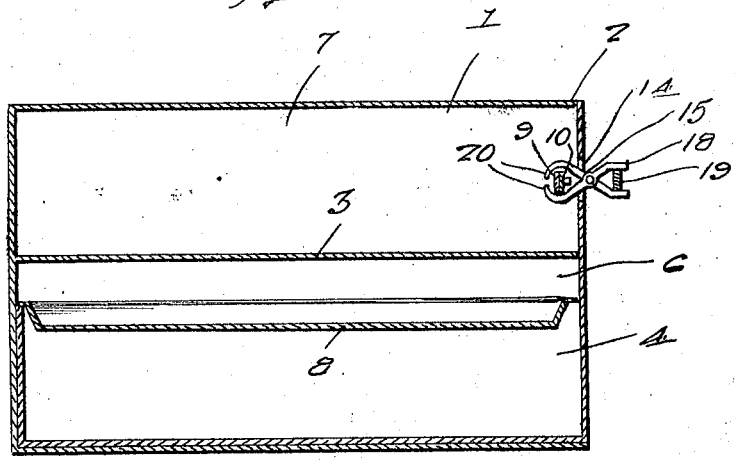
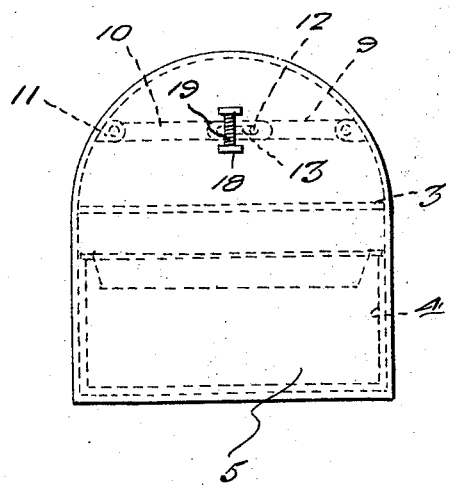
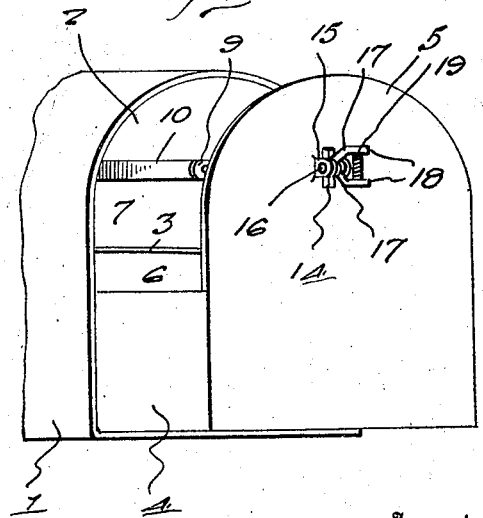
Inventor
R. Tedesco
By Clarence A. O'Brien
Attorney Patented Jan. 6, 1925.

1,522,085

UNITED STATES PATENT OFFICE.

RALPH TEDESCO, OF FOREST CITY, PENNSYLVANIA.

SECURING MEANS FOR LUNCH BOXES.

Application filed April 16, 1924. Serial No. 706,905.

*To all whom it may concern:*

Be it known that I, RALPH TEDESCO, a citizen of the United States, residing at Forest City, in the county of Susquehanna and State of Pennsylvania, have invented certain new and useful Improvements in Securing Means for Lunch Boxes, of which the following is a specification.

This invention relates to improvements in lunch boxes, and means for securing the separable parts thereof together.

An object of the invention resides in providing a lunch box including a casing open at one end and adapted to slidably receive a container for a portion of the lunch, the container being provided with means for cooperation with other means adjustably mounted in the casing for locking the container in said casing.

Another object of the invention resides in providing a lunch box having a casing provided with a central horizontal partition wall adapted to slidably receive a lunch container adapted to slidably fit in one compartment of the casing, and carrying a closure and the open end of said container provided with means cooperating with an adjustable means carried by the casing for locking the parts in assembled relation.

A further object of the invention resides in providing a casing open at one end for slidably receiving a lunch container with a pair of inter-connected links pivotally mounted in the open end of said casing adapted in one position to be clutched between a pair of pivoted jaws carried by the lunch container.

The invention also includes other objects and improvements in the details of construction and arrangement of parts which are more particularly described in the following description, and claim directed to a preferred form of the invention, it being understood however, that variations may be made in the specific structure and the positioning of the parts without departing from the scope of the description and claim.

In the drawing forming a part of this application,

Figure 1—is a vertical sectional view through a lunch box constructed in accordance with this invention.

Figure 2—is an end elevation thereof, and

Figure 3—is a detail showing the container partially removed from the casing.

The casing of the lunch box is indicated at 1, and is open at one end as indicated at 2, and is provided with a horizontal partition wall 3 positioned in the central portion thereof.

A container 4 carries at one end a closure plate 5, adapted to close the open end 2 of the casing, and the container is adapted to slidably fit in the roller section 6 of the casing below the partition 3. This container is adapted to contain portions of a meal, while the chamber 7 formed above the partition wall 3 is adapted to receive a bottle or the like, containing the liquid portion of the meal. A pan indicated at 8 is removably fitted in the top portion of the container 4, and is adapted to carry cake 6 and the like, and to separate the same from the remaining portion of the meal carried in the container.

A pair of links 9 and 10 respectively, are pivotally mounted on ears 11 carried by the upper portions of the opposite side walls of the casing adjacent the open end 2. One of the links carries a pin 12, at the free end thereof, and projecting laterally therefrom through a slot 13 formed longitudinally of the link 9 in order that the links will be interconnected and yet permitted to have a relative pivotal movement on their connections with the ears 11, so that the bottle or other liquid container in the chamber 7 may be removed therefrom. The upper portion of the closure plate 5 is formed with an opening 14 at the opposite sides of which are laterally extended ears 15 for receiving a pin 16 pivotally mounting a pair of jaw members 17 thereon. The outer ends of these jaw members are provided with angularly bent portions 18 arranged substantially parallel to one another and between which is positioned a coiled spring 19 normally forcing the parallel portions 18 apart to provide a gripping action between the curved ends 20 adapted to grip the bars 9 and 10, when the end plate is in a position to close the end of the casing, as shown in Figure 1. The end portions 18 are adapted to form handles which may be pressed toward each other against the tension of the spring 19 for removing the curved ends 20 from their gripping cooperation with the bars 9 and 10, so that the container and the closure plate 5 may be removed from the housed position, as shown in Figure 1.

From the foregoing description, it should be readily understood that the gripping jaws 17 cooperate with the bars 9 and 10 to provide a means for locking the container and end plate in the casing, and will effectively prevent the loss of the contained lunch therefrom. It is further noted that a bottle or other container in the chamber 7 may be easily removed from said chamber by moving the bars 9 and 10 upwardly, on their pivots with the ears 11 which is permitted through the pin and slot connections of the other ends.

Having thus described my invention, what I claim as new, and desire to secure by Letters Patent, is:

A lunch box comprising a casing having a horizontal partition wall in the central portion thereof and open at one end, a pair of links pivotally connected to opposite sides of the container in the open end of the upper compartment formed by said partition, and having the other ends connected by pin and slot connection, a container adapted to slidably fit in the compartment below said partition, a closure plate mounted on said container and adapted to close the open end of said casing, an opening formed in said plate adjacent the upper end thereof, a pair of gripping members pivotally connected to said closure plate and extended through said opening, and means for normally separating the outer ends of said members to move the inner ends toward each other for locking cooperation with said links to lock said container and closure plate in said casing.

In testimony whereof I affix my signature.

RALPH TEDESCO.